(12) United States Patent
Yang et al.

(10) Patent No.: US 9,795,897 B2
(45) Date of Patent: Oct. 24, 2017

(54) SYSTEMS, ARTICLES, AND METHODS FOR REMOVING WATER FROM HYDROCARBON FLUIDS

(75) Inventors: Chuanfang Yang, Eden Prairie, MN (US); Kirit Patel, Bridgewater, NJ (US); Robert Pannepacker, Ambler, PA (US)

(73) Assignee: Donaldson Company, Inc., Minneapolis, MN (US)

( * ) Notice: Subject to any disclaimer, the term of this patent is extended or adjusted under 35 U.S.C. 154(b) by 1757 days.

(21) Appl. No.: 11/557,684

(22) Filed: Nov. 8, 2006

(65) Prior Publication Data
US 2008/0105629 A1    May 8, 2008

(51) Int. Cl.
| | | |
|---|---|---|
| *B01D 71/36* | (2006.01) | |
| *B01D 69/10* | (2006.01) | |
| *B01D 17/00* | (2006.01) | |
| *C10G 33/06* | (2006.01) | |

(52) U.S. Cl.
CPC ............ *B01D 17/10* (2013.01); *B01D 69/10* (2013.01); *B01D 71/36* (2013.01); *C10G 33/06* (2013.01); *B01D 2325/02* (2013.01); *B01D 2325/04* (2013.01); *B01D 2325/38* (2013.01)

(58) Field of Classification Search
CPC ........ B01D 71/36; B01D 69/10; B01D 17/02; B01D 17/04; B01D 17/045; B01D 17/10; B01D 2323/04; B01D 2325/04; B01D 2325/38; B01D 2325/40; B01D 63/06; B01D 2325/02; C10G 33/06
See application file for complete search history.

(56) References Cited

U.S. PATENT DOCUMENTS

| | | | |
|---|---|---|---|
| 3,019,904 A * | 2/1962 | Stecher | 210/312 |
| 3,367,504 A * | 2/1968 | Westmoreland | 210/321.83 |
| 3,700,595 A | 10/1972 | Kaiser | |
| 3,953,566 A | 4/1976 | Gore | |
| 4,187,390 A | 2/1980 | Gore | |
| 4,190,426 A * | 2/1980 | Ruschke | A61M 5/36 128/205.12 |
| 4,253,954 A * | 3/1981 | Midkiff et al. | 210/315 |
| 4,372,847 A * | 2/1983 | Lewis | 210/86 |

(Continued)

OTHER PUBLICATIONS

PCT International Search Report, dated Apr. 3, 2008 (4 pages).

*Primary Examiner* — David C Mellon
(74) *Attorney, Agent, or Firm* — Pauly, DeVries Smith & Deffner LLC (57) ABSTRACT

The present invention relates to systems, articles, and methods for removing water from hydrocarbon fluids. In an embodiment, the invention includes a water/fuel separation system including a filter housing and a filter element disposed within the filter housing. The filter element can include a separation article including a porous polymer layer having and a porous substrate comprising a hydrophobic surface. In an embodiment, the invention includes a filter element for separating emulsified water from a hydrocarbon fluid. In an embodiment, the invention includes a method for filtering water out of a hydrocarbon fluid including passing a hydrocarbon fluid through a separation article including a polymer layer comprising polytetrafluoroethylene; and a porous substrate comprising a hydrophobic surface, the polymer layer disposed on the porous substrate.

25 Claims, 5 Drawing Sheets

(56) References Cited

U.S. PATENT DOCUMENTS

| | | | |
|---|---|---|---|
| 4,619,897 A * | 10/1986 | Hato et al. | 435/182 |
| 4,777,137 A | 10/1988 | Lemonnier | |
| 4,780,211 A | 10/1988 | Lien | |
| 4,814,087 A * | 3/1989 | Taylor | 210/641 |
| 4,863,604 A * | 9/1989 | Lo et al. | 210/490 |
| 4,891,407 A | 1/1990 | Mitchell | |
| 4,892,667 A | 1/1990 | Parker, III et al. | |
| 4,945,125 A | 7/1990 | Dillon et al. | |
| 4,995,974 A | 2/1991 | Lorey et al. | |
| 5,019,140 A * | 5/1991 | Bowser | A61F 5/441 |
| | | | 428/422 |
| 5,066,683 A | 11/1991 | Dillon et al. | |
| 5,157,058 A | 10/1992 | Dillon et al. | |
| 5,362,533 A | 11/1994 | Fukuda et al. | |
| 5,443,724 A | 8/1995 | Williamson et al. | |
| 5,478,372 A * | 12/1995 | Stark | 55/521 |
| 5,904,845 A | 5/1999 | Girondi | |
| 6,110,333 A | 8/2000 | Spethmann et al. | |
| 6,235,377 B1 | 5/2001 | Dillon et al. | |
| 6,422,396 B1 | 7/2002 | Li et al. | |
| 6,517,919 B1 * | 2/2003 | Griffin | 428/36.1 |
| 6,764,598 B2 | 7/2004 | Yu et al. | |
| 7,655,140 B2 * | 2/2010 | Wieczorek et al. | 210/120 |
| 2004/0222156 A1 | 11/2004 | Yu et al. | |

\* cited by examiner

SYSTEMS, ARTICLES, AND METHODS FOR REMOVING WATER FROM HYDROCARBON FLUIDS

FIELD OF THE INVENTION

The present invention relates to systems, articles, and methods for removing water from hydrocarbon fluids. More specifically, the present invention relates to systems, articles, and methods for removing emulsified water from low-sulphur diesel fuel.

BACKGROUND OF THE INVENTION

Emulsified water contamination in fuel is a serious concern as it affects the performance and operation of engines. Emulsified water contamination can cause various problems including fuel filter plugging, fuel starvation, damage of engine components through cavitation and corrosion, and promotion of microbiological growth.

Various devices have been employed to reduce the amount of emulsified water contamination in fuel. By way of example, coalescing and separating devices have been employed to first cause the emulsified water to coalesce into larger droplets and then remove the enlarged droplets from the fuel stream.

Recently, efforts have been focused on reducing air pollution caused by the combustion of hydrocarbon fluids. Sulphur contributes directly to the pollution caused by the combustion of diesel fuels. Diesel fuels have been refined with reduced amounts of sulphur to meet the diesel engine emission control regulation. However, these low-sulphur diesel fuels have necessitated the use of other additives. By way of example, surfactants have been added to low-sulphur diesel fuels to maintain sufficient lubricity of the diesel fuel for the engine.

Surfactants have also the effect of stabilizing emulsified water in fuel because they lower the interfacial tension between water and fuel. Lowering the interfacial tension between water and fuel makes it more difficult to coalesce the emulsified water into larger droplets. Therefore, surfactants make it more difficult to remove emulsified water from hydrocarbon fuels.

Accordingly, a need exists for systems, materials, and methods that can be used for removing water from hydrocarbon fluids, such as ultra low-sulphur diesel fuel.

SUMMARY OF THE INVENTION

The present invention relates to systems, articles, and methods for removing water from hydrocarbon fluids. In an embodiment, the invention includes a water/fuel separation system including a filter housing; and a filter element disposed within the filter housing, the filter element including a separation article, the separation article including a porous polymer layer comprising polytetrafluoroethylene and a porous substrate comprising a hydrophobic surface, the porous polymer layer disposed on the porous substrate.

In an embodiment, the invention includes a filter element for separating emulsified water from a hydrocarbon fluid, the filter element including a separation article, the separation article including a porous polymer layer comprising polytetrafluoroethylene and a porous substrate comprising a hydrophobic surface, the porous polymer layer disposed on the porous substrate.

In an embodiment, the invention includes a method for filtering water out of a hydrocarbon fluid including passing a hydrocarbon fluid through a separation article, the separation article including a polymer layer comprising polytetrafluoroethylene and a porous substrate comprising a hydrophobic surface, the polymer layer disposed on the porous substrate.

The above summary of the present invention is not intended to describe each discussed embodiment of the present invention. This is the purpose of the figures and the detailed description that follows.

DRAWINGS

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

As described above, new hydrocarbon fuel formulations, such as ultralow sulfur diesel fuel contain significant amounts of surfactants. While surfactants beneficially provide lubricity, they also have the side effect of stabilizing emulsified water in fuel because they lower the interfacial tension between water and fuel. As a result, surfactants make it more difficult to remove emulsified water from hydrocarbon fuels.

However, as shown herein, a polymeric layer disposed over a substrate with a hydrophobic surface can efficiently remove emulsified water from a stream of hydrocarbon fuel. Embodiments of the present invention include systems, articles, and methods for removing emulsified water from fuels containing surfactants, such as ultralow-sulphur diesel fuel. By way of example, in an embodiment the invention includes a water/fuel separation system including a filter housing and a filter element disposed within the filter housing. The filter element can include a separation article with a porous polymer layer of polytetrafluoroethylene, the porous polymer layer having an average pore size of between about 0.1 μm to about 5.0 μm, and a porous substrate comprising a hydrophobic surface. Embodiments of the invention also include systems, articles, and methods for removing emulsified water from other hydrocarbon fluids including transformer oil, lubricant oil, hydraulic oil, and the like.

Figure 1:
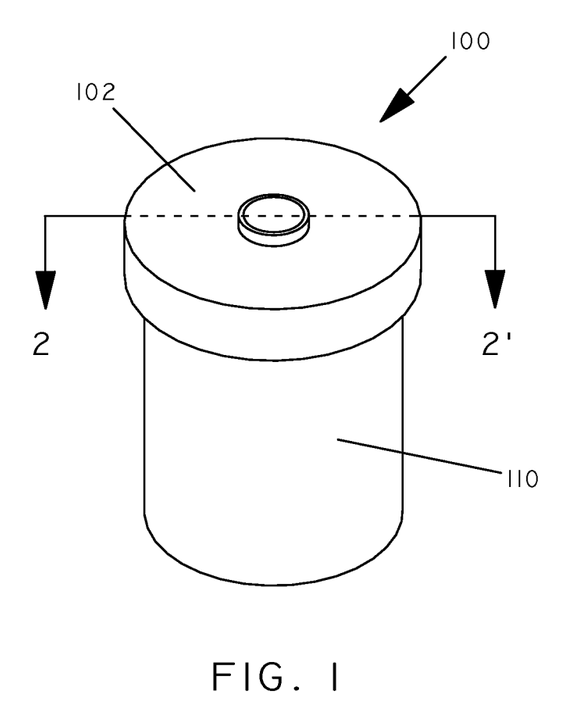
FIG. 1 is a schematic perspective view of a water/fuel separation system in accordance with an embodiment of the invention.
Figure 2:
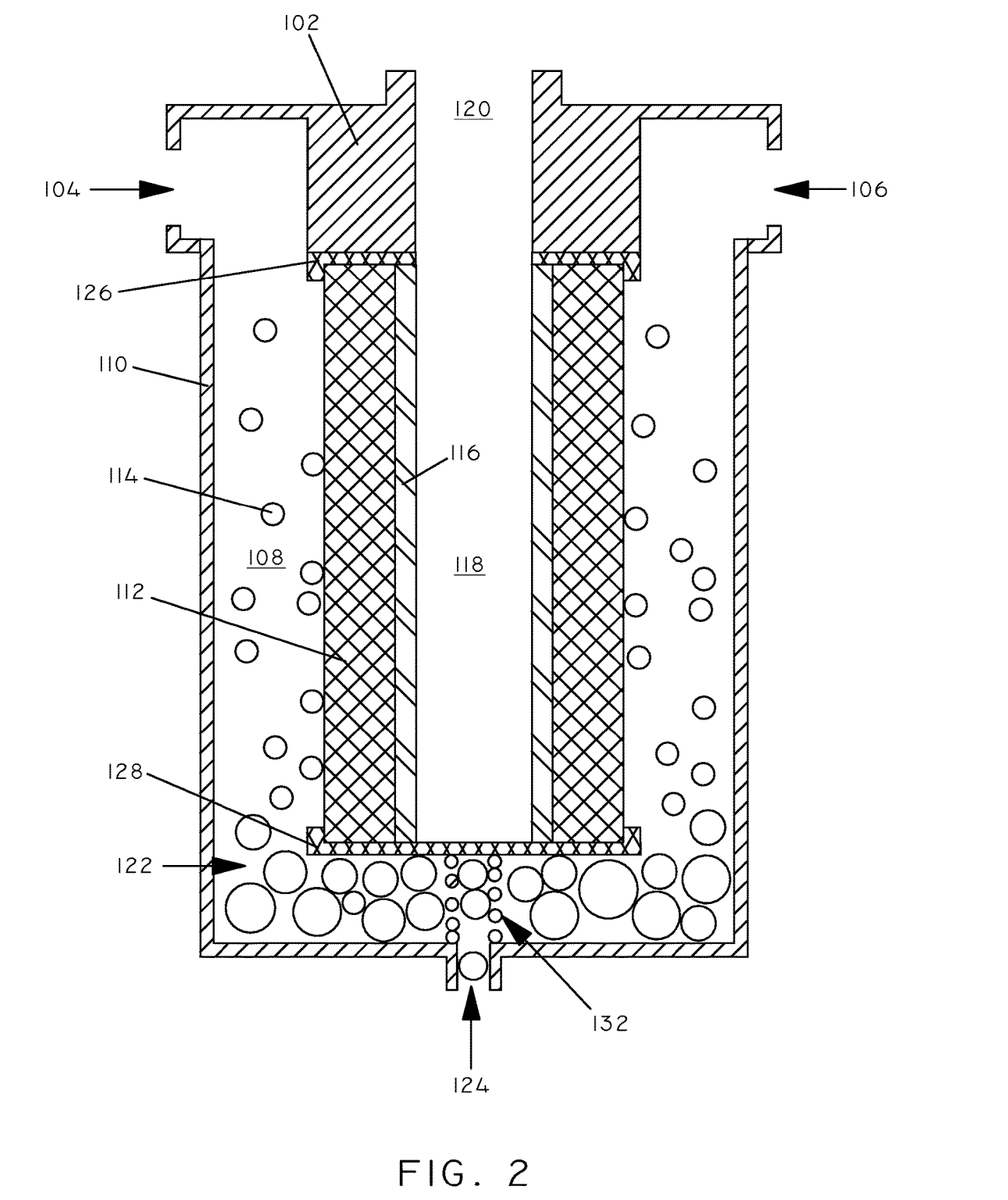
FIG. 2 is a schematic cross-sectional view of a water/fuel separation system taken along line 2-2' of FIG. 1.

Referring now to FIG. 1, a schematic perspective view of a water/fuel separation system 100 is shown in accordance with an embodiment of the invention. A filter head 102 is operably connected to a filter body 110. Together, the filter head 102 and the filter body 110 can be referred to as a filter housing. Referring now to FIG. 2, a cross-sectional view of a water/fuel separation system taken along line 2-2' of FIG. 1 is shown. Fuel enters a filter head 102 through an aperture 104 or 106. The fuel then enters a cavity 108 defined by the filter body 110. Fuel then contacts a separation article 112 where emulsified water coalesces into water droplets 114. The fuel then passes through the separation article 112 and through an inner liner 116 before entering a central filter lumen 118. The separation article 112 and the inner liner 116 are connected to a top filter element end cap 126 and a bottom filter element end cap 128. The separation article 112, inner liner 116, top filter end cap 126, and bottom filter end cap 128 together can be referred to as a filter element. The filtered fuel then passes through an exit port 120 in the filter head 102 before passing out of the water/fuel separation system. The water droplets 114 coalesce and then pass down to a collection basin 122 under the influence of gravity. The coalesced water droplets then flow out of a drain port 124. A spring 132 can be used to hold the filter element 130 in place within the filter housing 110.

It will be appreciated that embodiments of water/fuel separation systems can take on configurations other than that illustrated in FIGS. 1 and 2. By way of example, U.S. Pat. Nos. 4,995,974; 5,443,724; and 6,764,598 illustrate other physical configurations of water/fuel separation systems (the contents of which that is directed to water/fuel separation system configurations is herein incorporated by reference).

Figure 3:
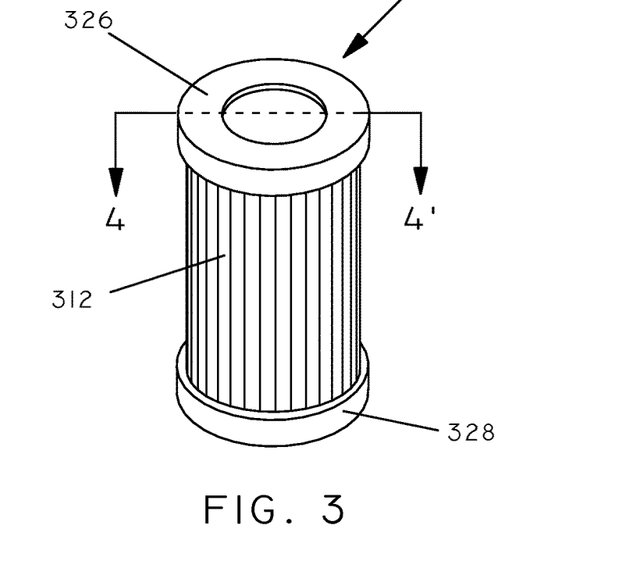
FIG. 3 is a schematic perspective view of a filter element in accordance with an embodiment of the invention.

FIG. 3 is a schematic perspective view of a filter element 300 in accordance with an embodiment of the invention. The filter element 300 includes a separation article 312, top filter element end cap 326, and bottom filter element end cap 328. The separation article 312 can include various components as described more fully below. The separation article 312 may be in a pleated configuration or flat. The top filter end cap 326 and the bottom filter end cap 328 may include various materials such as polymers, metals, cellulosic materials, and the like. In an embodiment, the top filter end cap 326 and the bottom filter end cap 328 include stainless steel.

Figure 4:
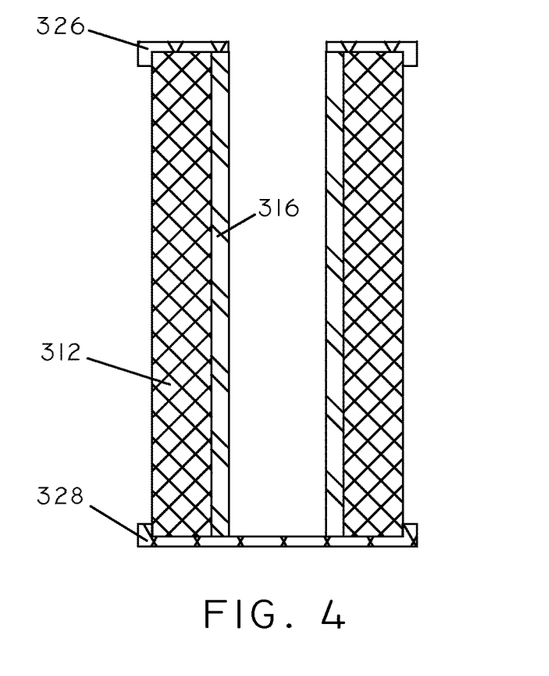
FIG. 4 is a cross-sectional schematic view of a filter element taken along line 4-4' of FIG. 3.

Referring now to FIG. 4, a cross-sectional schematic view of a filter element 300 taken along line 4-4' of FIG. 3 is shown. This view of the filter element 300 shows a separation article 312, inner liner 316, top filter element end cap 326, and bottom filter element end cap 328. The inner liner 316 provides structural rigidity sufficient to support the separation article 312. However, it will be appreciated that in some embodiments the inner liner 316 may be omitted.

The inner liner 316 connects the top filter end cap 326 with the bottom filter end cap 328. The inner liner 316 can be sufficiently porous so as to freely allow the passage of fuel. In some embodiments, the inner liner 316 may be composed of a mesh structure. The inner liner 316 may include various materials such as polymers, metals, cellulosic materials, and the like. In an embodiment, the inner liner 316 includes a metal mesh.

Figure 5:
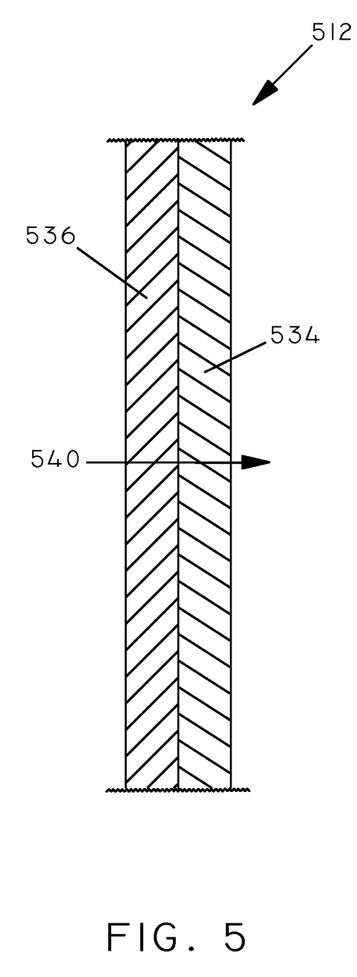
FIG. 5 is a cross-sectional schematic view of a portion of a separation article in accordance with an embodiment of the invention.

Referring now to FIG. 5, a cross-sectional view of a portion of a separation article 512 in accordance with an embodiment of the invention is shown. In some embodiments, the separation article 512 can include a laminate. The separation article 512 includes a porous polymeric outer layer 536 and a substrate 534. Fuel moves through the porous polymeric outer layer 536 and the substrate 534 in the direction of arrow 540.

The porous polymeric outer layer 536 can include a fluoropolymer. In some embodiments, the porous polymer outer layer 536 includes polyvinylidene fluoride (PVDF). In some embodiments, the porous polymer outer layer 536 includes polytetrafluoroethylene (PTFE). In some embodiments, the porous polymer outer layer 536 includes an expanded polytetrafluoroethylene (ePTFE) film. The ePTFE film can include a plurality of nodes interconnected by fibrils to form a microporous structure. ePTFE films are described, for example, in U.S. Pat. Nos. 3,953,566; 4,187,390; 4,945,125; 5,066,683; 5,157,058; and 5,362,553, the contents of all of which are herein incorporated by reference. The porous polymer outer layer 536 can also include membranes as described in U.S. Pat. Nos. 4,891,407; 4,945,125; 6,110,333; and 6,235,377, including PTFE and silicone interpenetrating and/or semi-interpenetrating networks, the contents of all of which are herein incorporated by reference.

The porous polymeric outer layer 536 may restrict fluid flow more than desired if it is too thick. In an embodiment, the porous polymeric outer layer 536 is less than about 10.0 mils thick. In an embodiment, the porous polymeric outer layer 536 is less than about 5.0 mils thick. The porous polymer outer layer 536 may not retain structural integrity under conditions of use if it is too thin. In an embodiment, the porous polymeric outer layer 536 is greater than about 0.1 mils thick. In some embodiments, the porous polymeric outer layer 536 can be from about 0.2 mils to about 5 mils in thickness.

Pore size of the porous polymeric outer layer 536 can be measured according to ASTM E1294-89(1999) entitled "Standard Test Method for Pore Size Characteristics of Membrane Filters Using Automated Liquid Porosimeter" (the contents of which is herein incorporated by reference). Exemplary porosimeter instruments include those manufactured by Porous Materials, Inc., Ithaca, N.Y. Pore size influences various aspects of filtering performance such as the size of material that is prevented from passing through and the fluid flow resistance of the material. If the pore size of the porous polymeric outer layer 536 is too large, particles larger than desired may pass through. In an embodiment, the average pore size of the porous polymeric outer layer 536 is less than about 10 μm. If the pore size of the porous polymer outer layer 536 is too small, then the porous polymeric outer layer 536 may inhibit fluid flow more than desired. In an embodiment, the average pore size of the porous polymeric outer layer is greater than about 0.01 μm. In some embodiments, the porous polymeric outer layer 536 can have an average pore size of about 0.1 μm to about 10 μm. In some embodiments, the porous polymeric outer layer 536 can have an average pore size of about 0.1 μm to about 5.0 μm. In some embodiments, the porous polymeric outer layer 536 can have an average pore size of about 0.5 μm to about 3.0 μm.

Permeability (such as the Frazier air permeability) of the porous polymeric outer layer 536 can be measured according to ASTM D737 entitled "Test Method for Air Permeability of Textile Fabrics" (the contents of which is herein incorporated by reference). The permeability of the porous polymeric outer layer 536 can affect various aspects of the separation article including the resistance to fluid flow. If the porous polymeric outer layer 536 is too permeable, it may not remove emulsified water from the diesel fuel as efficiently as desired. In an embodiment, the porous polymeric outer layer 536 has a permeability of less than about 60 cfm/ft² (cubic feet per minute per square foot). If the porous polymeric outer layer 536 is not permeable enough, the resistance of the separation article to fluid flow may be undesirably high. In an embodiment, the porous polymeric outer layer 536 has a permeability of greater than about 0.2 cfm/ft². In an embodiment, the porous polymeric outer layer 536 has a permeability of about 1 cfm/ft² to about 25 cfm/ft².

The substrate 534 can include various materials such as cellulose, woven glass, polymers (such as polypropylene and polyester), various types of papers, fabrics, and the like. In an embodiment, the substrate 534 and/or a surface of the substrate 534 is hydrophobic. As shown in the examples below, a substrate 534 with a hydrophobic surface can enhance the filtering efficiency of the separation article. One approach to quantifying hydrophobic properties is to measure the water contact angle. The higher the water contact angle, the more hydrophobic the surface being measured. Water contact angle can be measured using various pieces of equipment such as a FTA 200 (First Ten Angstroms, Portsmouth, Va.) dynamic contact angle analyzer. In an embodiment, substrate 534 has a water contact angle of greater than about 50°. In an embodiment, substrate 534 has a water contact angle of greater than about 100°. In an embodiment, substrate 534 has a water contact angle of between about 60° and about 140°.

In some embodiments, the primary material of the substrate 534 is sufficiently hydrophobic by itself. In other embodiments, the primary material of the substrate 534 is treated to render it sufficiently hydrophobic. By way of example, materials may be impregnated or coated with a hydrophobic material, such as silicone, to render their surfaces sufficiently hydrophobic. In an embodiment, the substrate includes cellulose impregnated with silicone.

The substrate 534 may restrict fluid flow more than desired if it is too thick. In an embodiment, the substrate 534 is less than about 60 mils thick. The substrate 534 may not retain structural integrity under conditions of use if it is too thin. In an embodiment, the substrate 534 is greater than about 1 mils thick. In some embodiments, the substrate 534 is from about 1 mils to about 60 mils in thickness. In some embodiments, the substrate 534 is from about 2 mils to about 30 mils in thickness.

The permeability of the substrate 534 can affect various aspects of the separation article including the resistance to fluid flow. If the substrate 534 is too permeable, it may not have sufficient efficiency removing emulsified water from the diesel fuel. In an embodiment, the substrate 534 has a permeability of less than 1000 cfm/ft². If the substrate 534 is not permeable enough, the resistance of the separation article to fluid flow may be undesirably high. In an embodiment, the substrate 534 has a permeability of greater than about 1 cfm/ft². In an embodiment, the substrate 534 has a permeability of about 2 cfm/ft² to about 200 cfm/ft².

In some embodiments, the porous polymeric outer layer 536 and the substrate 534 are laminated together. The lamination of the porous polymeric outer layer 536 and the substrate 534 can be accomplished by a variety of methods including, for example, heat welding, ultrasonic welding, adhesive lamination, gravure lamination, and the like. In a particular embodiment, the porous polymeric outer layer 536 and the substrate 534 are thermally welded together.

In some embodiments, the substrate 534 is a screen or netting that supports the porous polymeric outer layer 536. In such an embodiment, the substrate 534 may or may not be attached to the porous polymeric outer layer 536. The screen or netting can include a variety of materials such as polymers, metals, and the like.

The separation article 512 can efficiently separate water from hydrocarbon fluids. In an embodiment, the separation article 512 can remove at least about 90% of emulsified water from hydrocarbon fluids having an interfacial tension (IFT) of about 7 dynes/cm to about 40 dynes/cm. In an embodiment, the separation article 512 can remove at least about 95% of emulsified water from hydrocarbon fluids having an interfacial tension (IFT) of about 7 dynes/cm to about 40 dynes/cm.

Figure 6:
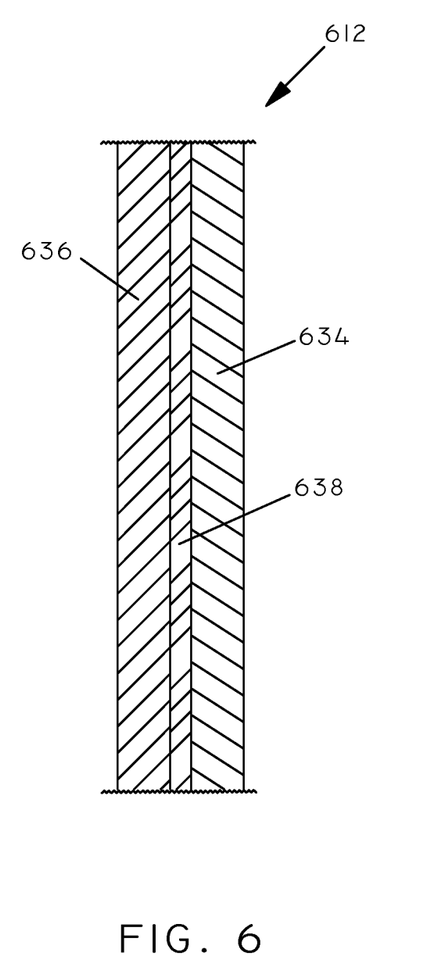
FIG. 6 is a cross-sectional schematic view of a portion of a separation article in accordance with another embodiment of the invention.

FIG. 6 illustrates another embodiment of a separation article 612 in accordance with the invention. In this embodiment, a laminating adhesive layer 638 is disposed in between a porous polymeric outer layer 636 and a substrate 634. The laminating adhesive layer 638 may include any of a variety of temporary or permanent adhesives including, for example, thermoplastic resins, thermosetting resins, cements, contact adhesives, and pressure sensitive adhesives. In an embodiment, the laminating adhesive layer 638 includes a PTFE dispersion.

Embodiments of the invention can also include methods of filtering water out of a hydrocarbon fluid. Embodiments of the invention can also include methods of filtering emulsified water out of a hydrocarbon fluid. In an embodiment, the method includes passing a hydrocarbon fluid through a filter element and/or a separation article. The hydrocarbon fluid can include fuels, oils, greases, lubricating fluids, and the like. The separation article can include components as described above. In an embodiment, the separation articles can include a polymer layer comprising polytetrafluoroethylene, the polymer layer having an average pore size of about 0.1 µm to about 10.0 µm; and a porous substrate comprising a hydrophobic surface, the polymer layer disposed on the porous substrate. The separation article can promote coalescence of the water in the hydrocarbon fluid. The method can include collecting coalesced water droplets from the hydrocarbon fluid. In some embodiments, the method can include removing at least about 90% of emulsified water from a hydrocarbon fluid. In some embodiments, the method can include removing at least about 95% of emulsified water from a hydrocarbon fluid.

The present invention may be better understood with reference to the following examples. These examples are intended to be representative of specific embodiments of the invention, and are not intended as limiting the scope of the invention.

EXAMPLES

Example 1: Preparation of Separation Article #1

A layer of expanded PTFE was thermally welded to a substrate of polyester (0.75 ounces per square yard) (REEMAY 2275 available from BBA FIBERWEB Filtration) to form separation article #1. The PTFE layer had an average pore size of 0.2 µm as measured according to ASTM E1294 using a porosimeter (Porous Materials, Inc., Ithaca, N.Y.). The permeability (Frazier permeability) of the PTFE was 0.65 cfm/ft² as measured according to ASTM D737. The PTFE layer had a thickness of 3 mils. The permeability (Frazier permeability) of the substrate was 925 cfm/ft² as measured according to ASTM D737. The substrate had a thickness of 6 mils.

Example 2: Preparation of Separation Article #2

A layer of expanded PTFE was thermally welded to a substrate of polypropylene felt (12.5 ounces per square yard)

(Southern Felts, Augusta, S.C.) to form separation article #2. The PTFE layer had an average pore size of 0.7 µm as measured according to ASTM E1294 using a porosimeter (Porous Materials, Inc., Ithaca, N.Y.). The permeability (Frazier permeability) of the PTFE was 1.5 cfm/ft$^2$ as measured according to ASTM D737. The PTFE layer had a thickness of 3 mils. The permeability (Frazier permeability) of the substrate was 40 cfm/ft$^2$ as measured according to ASTM D737. The substrate had a thickness of 8.5 mils.

Example 3: Preparation of Separation Article #3

A layer of asymmetric PTFE was thermally welded to a bicomponent substrate of polypropylene and polyethylene to form separation article #3. The PTFE layer had with a pore gradient from 0.8 to 0.1 µm along the membrane thickness as measured according to ASTM E1294 using a porosimeter (Porous Materials, Inc., Ithaca, N.Y.). The permeability (Frazier permeability) of the PTFE was 0.4 cfm/ft$^2$ as measured according to ASTM D737. The PTFE layer had a thickness of 1.0 mils. The permeability (Frazier permeability) of the substrate was 67 cfm/ft$^2$ as measured according to ASTM D737. The substrate had a thickness of 6 mils.

Example 4: Preparation of Separation Article #4

A layer of expanded PTFE was thermally welded to a substrate of 95% polyester and 5% glass (3.6 ounces per square yard) to form separation article #4. The PTFE layer had an average pore size of 1 µm as measured according to ASTM E1294 using a porosimeter (Porous Materials, Inc., Ithaca, N.Y.). The permeability (Frazier permeability) of the PTFE was 5.5 cfm/ft$^2$ as measured according to ASTM D737. The PTFE layer had a thickness of 0.9 mils. The permeability (Frazier permeability) of the substrate was 155 cfm/ft$^2$ as measured according to ASTM D737. The substrate had a thickness of 29 mils.

Example 5: Preparation of Separation Article #5

A layer of expanded PTFE was thermally welded to a substrate of 60% polyester and 40% glass (4 ounces per square yard) to form separation article #5. The PTFE layer had an average pore size of 1 µm as measured according to ASTM E1294 using a porosimeter (Porous Materials, Inc., Ithaca, N.Y.). The permeability (Frazier permeability) of the PTFE was 5.5 cfm/ft$^2$ as measured according to ASTM D737. The PTFE layer had a thickness of 0.9 mils. The permeability (Frazier permeability) of the substrate was 33 cfm/ft$^2$ as measured according to ASTM D737. The substrate had a thickness of 27 mils.

Example 6: Preparation of Separation Article #6

A layer of expanded PTFE was thermally welded to a substrate of 50% polyester and 50% glass (3.8 ounces per square yard) to form separation article #6. The PTFE layer had an average pore size of 1.0 µm as measured according to ASTM E1294 using a porosimeter (Porous Materials, Inc., Ithaca, N.Y.). The permeability (Frazier permeability) of the PTFE was 5.5 cfm/ft$^2$ as measured according to ASTM D737. The PTFE layer had a thickness of 0.9 mils. The permeability (Frazier permeability) of the substrate was 100 cfm/ft$^2$ as measured according to ASTM D737. The substrate had a thickness of 34 mils.

Example 7: Preparation of Separation Article #7

A layer of expanded PTFE was thermally welded to a substrate of 92% Polyester/8% Cellulose (3.4 ounces per square yard) (TRINITEX® C794115) to form separation article #7. TRINITEX® C794115 was obtained from Ahlstrom Corporation, Helsinki, Finland. The PTFE layer had an average pore size of 1.0 µm as measured according to ASTM E1294 using a porosimeter (Porous Materials, Inc., Ithaca, N.Y.). The permeability (Frazier permeability) of the PTFE was 5.5 cfm/ft$^2$ as measured according to ASTM D737. The PTFE layer had a thickness of 0.9 mils. The permeability (Frazier permeability) of the substrate was 94 cfm/ft$^2$ as measured according to ASTM D737. The substrate had a thickness of 34 mils.

Example 8: Preparation of Separation Article #8

A layer of expanded PTFE was thermally welded to a substrate of 95% polyester and 5% glass (3.6 ounces per square yard) to form separation article #8. The PTFE layer had an average pore size of 1.5 µm as measured according to ASTM E1294 using a porosimeter (Porous Materials, Inc., Ithaca, N.Y.). The permeability (Frazier permeability) of the PTFE was 1.7 cfm/ft$^2$ as measured according to ASTM D737. The PTFE layer had a thickness of 3.0 mils. The permeability (Frazier permeability) of the substrate was 155 cfm/ft$^2$ as measured according to ASTM D737. The substrate had a thickness of 29 mils.

Example 9: Preparation of Separation Article #9

A layer of expanded PTFE was thermally welded to a substrate of 60% polyester and 40% glass (4 ounces per square yard) to form separation article #9. The PTFE layer had an average pore size of 1.5 µm as measured according to ASTM E1294 using a porosimeter (Porous Materials, Inc., Ithaca, N.Y.). The permeability (Frazier permeability) of the PTFE was 1.7 cfm/ft$^2$ as measured according to ASTM D737. The PTFE layer had a thickness of 3.0 mils. The permeability (Frazier permeability) of the substrate was 33 cfm/ft$^2$ as measured according to ASTM D737. The substrate had a thickness of 27 mils.

Example 10: Preparation of Separation Article #10

A layer of expanded PTFE was thermally welded to a substrate of 50% polyester and 50% glass (3.8 ounces per square yard) to form separation article #10. The PTFE layer had an average pore size of 1.5 µm as measured according to ASTM E1294 using a porosimeter (Porous Materials, Inc., Ithaca, N.Y.). The permeability (Frazier permeability) of the PTFE was 1.7 cfm/ft$^2$ as measured according to ASTM D737. The PTFE layer had a thickness of 3.0 mils. The permeability (Frazier permeability) of the substrate was 100 cfm/ft$^2$ as measured according to ASTM D737. The substrate had a thickness of 34 mils.

Example 11: Preparation of Separation Article #11

A layer of high efficiency PTFE was thermally welded to a substrate of woven fiberglass (16 ounces per square yard) to form separation article #11. The PTFE layer had an average pore size of 1.0 µm to 2.0 µm (1.5 µm on average) as measured according to ASTM E1294 using a porosimeter (Porous Materials, Inc., Ithaca, N.Y.). The permeability (Frazier permeability) of the PTFE was 9 cfm/ft$^2$ as measured according to ASTM D737. The PTFE layer had a thickness of 2 mils. The permeability (Frazier permeability) of the substrate was 40 cfm/ft$^2$ as measured according to ASTM D737.

Example 12: Preparation of Separation Article #12

A layer of high efficiency PTFE was thermally welded to a substrate of woven fiberglass (22 ounces per square yard) to form separation article #12. The PTFE layer had an average pore size of 1.0 µm to 2.0 µm (1.5 µm on average) as measured according to ASTM E1294 using a porosimeter (Porous Materials, Inc., Ithaca, N.Y.). The permeability (Frazier permeability) of the PTFE was 9 cfm/ft$^2$ as measured according to ASTM D737. The PTFE layer had a thickness of 2 mils. The permeability (Frazier permeability) of the substrate was 65 cfm/ft$^2$ as measured according to ASTM D737.

Example 13: Preparation of Separation Article #13

A layer of expanded PTFE was thermally welded to a substrate of polyester (0.75 ounces per square yard) (REEMAY 2275 available from BBA FIBERWEB Filtration) to form separation article #13. The PTFE layer had an average pore size of 1.5 µm as measured according to ASTM E1294 using a porosimeter (Porous Materials, Inc., Ithaca, N.Y.). The permeability (Frazier permeability) of the PTFE was 2 cfm/ft$^2$ as measured according to ASTM D737. The PTFE layer had a thickness of 3 mils. The permeability (Frazier permeability) of the substrate was 925 cfm/ft$^2$ as measured according to ASTM D737. The substrate had a thickness of 6 mils.

Example 14: Preparation of Separation Article #14

A layer of high efficiency PTFE was thermally welded to a substrate of acid resistant woven fiberglass (22 ounces per square yard) to form separation article #14. The PTFE layer had an average pore size of 1.0 µm to 2.0 µm (1.5 µm on average) as measured according to ASTM E1294 using a porosimeter (Porous Materials, Inc., Ithaca, N.Y.). The permeability (Frazier permeability) of the PTFE was 9 cfm/ft$^2$ as measured according to ASTM D737. The PTFE layer had a thickness of 2 mils. The permeability (Frazier permeability) of the substrate was 35 cfm/ft$^2$ as measured according to ASTM D737.

Example 15: Preparation of Separation Article #15

A layer of expanded PTFE was thermally welded to a substrate of latex bonded cellulose (83 pounds per ream) to form separation article #15. The PTFE layer had an average pore size of 1.5 µm as measured according to ASTM E1294 using a porosimeter (Porous Materials, Inc., Ithaca, N.Y.). The permeability (Frazier permeability) of the PTFE was 5 cfm/ft$^2$ as measured according to ASTM D737. The PTFE layer had a thickness of 0.7 mils. The permeability (Frazier permeability) of the substrate was 93 cfm/ft$^2$ as measured according to ASTM D737. The substrate had a thickness of 24 mils.

Example 16: Preparation of Separation Article #16

A layer of expanded PTFE was thermally welded to a substrate of meta-aramid felt (NOMEX) (14 ounces per square yard) to form separation article #16. The PTFE layer had an average pore size of 2.0 µm as measured according to ASTM E1294 using a porometer (Porous Materials, Inc., Ithaca, N.Y.). The permeability (Frazier permeability) of the PTFE was 9 cfm/ft$^2$ as measured according to ASTM D737. The PTFE layer had a thickness of 2 mils. The permeability (Frazier permeability) of the substrate was 35 cfm/ft$^2$ as measured according to ASTM D737. The substrate had a thickness of 9 mils.

Example 17: Preparation of Separation Article #17

A layer of expanded PTFE was thermally welded to a substrate of polyester (0.75 ounces per square yard) (REEMAY 2275 available from BBA FIBERWEB Filtration) to form separation article #17. The PTFE layer had an average pore size of 5.0 µm as measured according to ASTM E1294 using a porosimeter (Porous Materials, Inc., Ithaca, N.Y.). The permeability (Frazier permeability) of the PTFE was 25 cfm/ft$^2$ as measured according to ASTM D737. The PTFE layer had a thickness of 0.3 mils. The permeability (Frazier permeability) of the substrate was 925 cfm/ft$^2$ as measured according to ASTM D737. The substrate had a thickness of 6 mils.

Example 18: Preparation of Separation Article #18

A layer of expanded PTFE was thermally welded to a substrate of cellulose (3.0 oz/sq yd) (TRINITEX® C794100) to form separation article #18. TRINITEX® C794100 was obtained from Ahlstrom Corporation, Helsinki, Finland. The PTFE layer had an average pore size of 3.0 µm as measured according to ASTM E1294 using a porosimeter (Porous Materials, Inc., Ithaca, N.Y.). The permeability (Frazier permeability) of the PTFE was 13.0 cfm/ft$^2$ as measured according to ASTM D737. The PTFE layer had a thickness of 0.9 mils. The permeability (Frazier permeability) of the substrate was 102 cfm/ft$^2$ as measured according to ASTM D737. The substrate had a thickness of 22 mils.

Example 19: Preparation of Separation Article #19

A layer of expanded PTFE (1317) was thermally welded to a substrate of cellulose (3.0 oz/sq.yd) (TRINITEX® C794100) to form separation article #19. TRINITEX® C794100 was obtained from Ahlstrom Corporation, Helsinki, Finland. The PTFE layer had an average pore size of 3.0 µm as measured according to ASTM E1294 using a porosimeter (Porous Materials, Inc., Ithaca, N.Y.). The permeability (Frazier permeability) of the PTFE was 18.5 cfm/ft$^2$ as measured according to ASTM D737. The PTFE layer had a thickness of 0.3 mils. The permeability (Frazier permeability) of the substrate was 102 cfm/ft$^2$ as measured according to ASTM D737. The substrate had a thickness of 22 mils.

Table 1 below summarizes aspects of the substrates of Examples 1-19.

TABLE 1

| | Substrate | |
|---|---|---|
| Article | Material | Weight (ounces/sq. yard) |
| 1 | Polyester (Reemay 2275) | 0.75 |
| 2 | Polypropylene Felt | 12.5 |
| 3 | Polypropylene/PE | 1.8 |
| 4 | 95% Polyester/5% Glass | 3.6 |
| 5 | 60% Polyester/40% Glass | 4 |
| 6 | 50% Polyester/50% Glass | 3.8 |

TABLE 1-continued

| | Substrate | |
|---|---|---|
| Article | Material | Weight (ounces/sq. yard) |
| 7 | 92% Polyester/8% Cellulose (Trinitex C794115) | 3.4 |
| 8 | 95% Polyester/5% Glass | 3.6 |
| 9 | 60% Polyester/40% Glass | 4 |
| 10 | 50% Polyester/50% Glass | 3.8 |
| 11 | Woven Fiberglass | 16 |
| 12 | Woven Fiberglass | 22 |
| 13 | Polyester (Reemay 2275) | 0.75 |
| 14 | Acid Resistant Woven Fiberglass | 22 |
| 15 | Latex Bonded Cellulose | 3.98 |
| 16 | Aramid Felt | 14 |
| 17 | Polyester (Reemay 2275) | 0.75 |
| 18 | Cellulose (Trinitex C794100) | 3.0 |
| 19 | Cellulose (Trinitex C794100) | 3.0 |

Table 2 below summarizes the pore size, thickness, and permeability for the separation articles of Examples 1-19.

TABLE 2

| | PTFE | | | Substrate | |
|---|---|---|---|---|---|
| Article | Pore Size (um) | Thickness (mils) | Permeability (cfm/ft2) | Thickness (mils) | Permeability (cfm/ft2) |
| 1 | 0.2 | 3 | 0.65 | 6 | 925 |
| 2 | 0.7 | 3 | 1.5 | 8.5 | 40 |
| 3* | 0.8-0.1 | 1 | 0.4 | 6 | 67 |
| 4 | 1.0 | 0.9 | 5.5 | 29 | 155 |
| 5 | 1.0 | 0.9 | 5.5 | 27 | 33 |
| 6 | 1.0 | 0.9 | 5.5 | 34 | 100 |
| 7 | 1.0 | 0.9 | 5.5 | 34 | 94 |
| 8 | 1.5 | 3 | 1.7 | 29 | 155 |
| 9 | 1.5 | 3 | 1.7 | 27 | 33 |
| 10 | 1.5 | 3 | 1.7 | 34 | 100 |
| 11** | 1.5 | 2 | 9 | NA | 40 |
| 12** | 1.5 | 2 | 9 | NA | 65 |
| 13 | 1.5 | 3 | 2 | 6 | 925 |
| 14** | 1.5 | 2 | 9 | NA | 35 |
| 15 | 1.5 | 0.7 | 5 | 24 | 93 |
| 16 | 2.0 | 2 | 9 | 9 | 35 |
| 17 | 3.0 | 0.3 | 25 | 6 | 925 |
| 18 | 3.0 | 0.9 | 13.0 | 22 | 102 |
| 19 | 3.0 | 0.3 | 18.5 | 22 | 102 |

*Asymmetric ePTFE with pore gradient from 0.8-0.1 um along the membrane thickness;
**High efficiency PTFE with pore size range of 1.0-2.0 um;
NA = Not Assessed

Example 20: Performance Testing of Separation Articles

Filtration efficiency testing was performed on the separation articles prepared in Examples 1-19 according to the following procedure. A flat sheet fuel/water bench was built in accordance with SAE J1488 including a flatsheet holder for testing 8×8 inch media samples. Ultralow sulfur diesel fuel was used as the test fuel. The test fuel temperature was held at a constant 80±2° F.

For each separation article tested, the sample was mounted vertically in place in the holder, the fuel pump was turned on, and the flow and test fuel temperature were allowed to stabilize. Emulsified water in the diesel test fuel was then generated by injecting distilled water into a stream of diesel fuel before a centrifugal pump upstream of the test media operating at 3500 rpm. This resulted in a concentration of emulsified water in the diesel fuel upstream of the separation article of about 2500±200 ppm. Water concentration was monitored both upstream and downstream of the separation article using a volumetric Karl-Fischer titrator. Fuel/water interfacial tension (in dynes/cm) was measured before and after each test with a semi-automatic tensiometer (Kruss Tensiometer K11, Kruss GmbH, Borsteler Chaussee 85-99a, 22453 Hamburg, Germany) using a DuNuoy ring. Water concentration downstream of the separation article was measured every 10-20 minutes depending on the total test duration time, which was typically 120-150 minutes.

The time-weighted water filtration efficiency was calculated using the water concentration difference upstream and downstream of the medium. By way of example, if the downstream water concentration (ppm) was on average only 5% of the upstream water concentration, then the efficiency was calculated to be 95%. Breakthrough time was also assessed for each separation article. Breakthrough time was defined as the time when the measured downstream water concentration exceeded 500 ppm.

Each separation article was evaluated at a flow rate of 0.4 L/min, some test substrates were also evaluated at a flow rate of 0.8 L/min. The performance data is summarized below in Table 3.

TABLE 3

| Article | Flow Rate (L/min) | Interfacial Tension (dynes/cm) | Efficiency | Breakthrough Time (min) | Substrate contact angle Degrees |
|---|---|---|---|---|---|
| 1 | 0.4 | 9.3 | 38.9 | 10 | 119 |
| 2 | 0.4 | NA | 53.5 | 30 | 0 |
| 3 | 0.4 | 9.6 | 91.7 | 50 | 105 |
| 4 | 0.4 | 14.3 | 61.1 | 5 | 0 |
| 5 | 0.4 | 12.4 | 70.2 | 25 | 0 |
| 6 | 0.4 | 14 | 89.5 | 80 | 60 |
| 7 | 0.4 | 13.5 | 96.7 | None | 118 |
|  | 0.8 | 13.4 | 86.3 | 80 | 118 |
| 8 | 0.4 | 6.9 | 57.6 | 30 | 0 |
| 9 | 0.4 | 12.3 | 18.3 | 5 | 0 |
| 10 | 0.4 | 13.7 | 87.1 | 140 | 60 |
| 11 | 0.4 | 12.3 | 85.2 | 60 | 132 |
|  | 0.4 | 13.5 | 93.7 | None | 132 |
|  | 0.8 | 12.8 | 96.7 | None | 132 |
|  | 0.8 | 12.5 | 99.7 | None | 132 |
| 12 | 0.4 | 12.2 | 96.9 | None | 123 |
|  | 0.4 | 12.8 | 99.5 | None | 123 |
|  | 0.8 | 12.6 | 99.6 | None | 123 |
|  | 0.8 | 11.7 | 95.9 | None | 123 |
| 13 | 0.4 | NA | 98.1 | None | 119 |
|  | 0.8 | NA | 91.6 | None | 119 |
| 14 | 0.4 | 12.4 | 94.3 | 90 | 124 |
|  | 0.4 | NA | 99 | None | 124 |
|  | 0.4 | NA | 98 | None | 124 |
|  | 0.8 | 12.7 | 99.1 | None | 124 |
|  | 0.8 | 12.8 | 99.6 | None | 124 |
|  | 0.8 | 12.3 | 96.8 | None | 124 |
| 15 | 0.4 | NA | 97.2 | None | 90 |
|  | 0.8 | NA | 98.4 | None | 90 |
| 16 | 0.4 | NA | 93.7 | None | 134 |
|  | 0.8 | NA | 82 | 100 | 134 |
| 17 | 0.4 | NA | 95.9 | None | 123 |
|  | 0.8 | 11.4 | 93.3 | None | 123 |
|  | 0.8 | 12.5 | 87.1 | 60 | 123 |
| 18 | 0.4 | 9.1 | 46.8 | 10 | 128 |
|  | 0.4 | 11.4 | 94 | None | 128 |
|  | 0.8 | 11.1 | 51.7 | 10 | 128 |
|  | 0.8 | 10.5 | 46.1 | 10 | 128 |

TABLE 3-continued

| Article | Flow Rate (L/min) | Interfacial Tension (dynes/cm) | Efficiency | Breakthrough Time (min) | Substrate contact angle Degrees |
|---|---|---|---|---|---|
| 19 | 0.4 | NA | 93.1 | None | 119 |
|  | 0.4 | 11.5 | 97.3 | None | 119 |
|  | 0.8 | 10.9 | 70 | 30 | 119 |
|  | 0.8 | 8.2 | 56.2 | 30 | 119 |

None = Break Through Did Not Occur During the Duration of the Test

Separation article #5 included a substrate with a water wettable (hydrophilic) surface (60% Polyester/40% Glass) and had a filtration efficiency of 70.2% at a flow rate of 0.4 L/min whereas separation article #7 included a substrate with a hydrophobic surface (92% Polyester/8% Cellulose) and had a filtration efficiency of 96.7% at a flow rate of 0.4 L/min. Comparison of the efficiency of separation article #5 with the efficiency of separation article #7 demonstrates that separation articles including substrates with hydrophobic surfaces are generally more efficient than separation articles including substrates with hydrophilic surfaces. Further supporting this point, the average filtration efficiency across all separation articles having a hydrophilic substrate surface (as assessed by water contact angle) was 52.14% whereas the average filtration efficiency across all separation articles having a hydrophobic substrate surface was 87.48%

Separation article #9 had the same substrate as separation article #5. The only difference between separation article #9 and separation article #5 was the PTFE layer. Separation article #9 included a PTFE layer with a pore size of 1.5 µm, a thickness of 3.0 mils and a permeability of 1.7 cfm/ft². In contrast, separation article #7 included a PTFE layer with a pore size of 1.0 µm, a thickness of 0.9 mils and a permeability of 5.5 cfm/ft². However, separation article #9 had a filtration efficiency of only 18.3% at a flow rate of 0.4 L/min whereas separation article #5 had a filtration efficiency of 70.2% at a flow rate of 0.4 L/min. The comparison between the performance of separation article #9 and separation article #5 shows that characteristics of the PTFE layer can significantly impact filtration efficiency. Specifically, this comparison shows that filtering efficiency may be reduced if the permeability of PTFE layer is too low.

Figure 7:
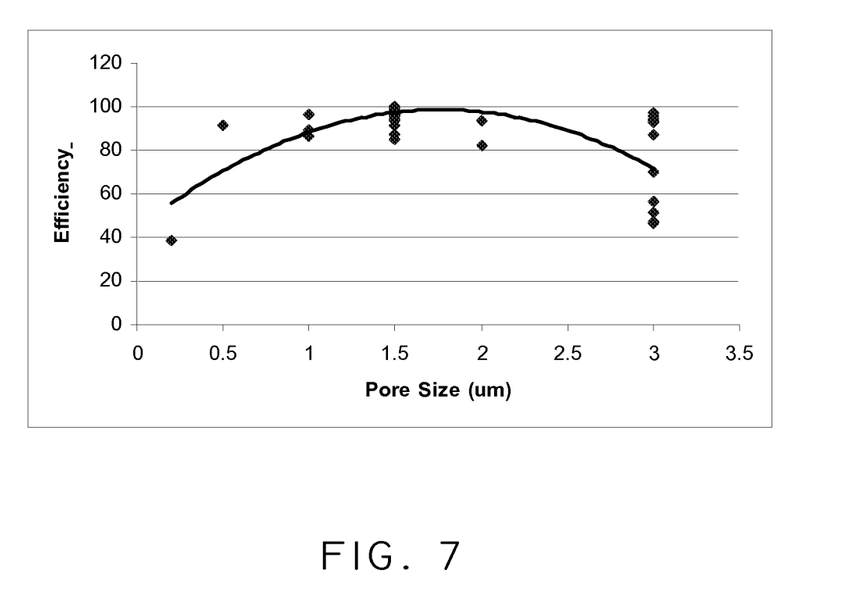
FIG. 7 is a scatter chart showing filtering efficiency versus pore size of a PTFE layer as part of a separation article.

FIG. 7 shows a scatter chart of PTFE pore size versus efficiency across all separation articles with hydrophobic substrate surfaces tested. A polynomial trend line based on average values for each pore size has been superimposed over the data. The data suggest that efficiency is affected by PTFE pore size. Specifically, the data suggest that a pore size range of about 0.5 µm to about 3.0 µm contributes to higher efficiency separation of emulsified water from hydrocarbon fuels. However, embodiments of the invention include articles with PTFE layers having an average pore size of between about 0.1 µm to about 5.0 µm.

It will be appreciated that, although the implementation of the invention described above is directed to articles for use in water/fuel separation systems in the context of engines, the present invention may be used with other types of water separation systems, and is not limited to fuel systems or engines. In addition, while the present invention has been described with reference to several particular implementations, those skilled in the art will recognize that many changes may be made hereto without departing from the spirit and scope of the present invention.

We claim:

1. A water/hydrocarbon fluid separation system comprising:
 a filter housing, the filter housing having at least one inlet and at least a first outlet and a second outlet, the first outlet positioned above the second outlet, and a collection basin beneath the first outlet, the collection basin configured for retaining water; and
 a filter element disposed within the filter housing, the filter element comprising
  a separation article comprising:
   a porous polymer layer comprising polytetrafluoroethylene, the porous polymer layer having an average pore size of between about 0.5 µm to about 5 µm, the porous polymer layer configured to selectively reject water and permeate liquid hydrocarbons; and
   a porous substrate layer comprising a hydrophobic surface, the porous polymer layer disposed adjacent to the porous substrate layer;
  wherein the porous polymer layer and porous substrate layer surround and wrap around a central filter lumen;
  wherein the porous substrate layer has a thickness of about 1 mils to about 60 mils and the porous substrate layer further comprises woven fiberglass;
  wherein the separation article is configured such that hydrocarbons flow through the separation article and out the first outlet of the housing, and water is collected upstream of the separation article and flows out the second outlet of the housing.

2. The water/hydrocarbon fluid separation system of claim 1, the filter housing defining a fluid flow path between the inlet and at least one of the first and second outlets, the filter element disposed in the fluid flow path between the inlet and at least one of the first and second outlets.

3. The water/hydrocarbon fluid separation system of claim 1, the filter housing defining a fluid flow path between the inlet and at least one of the first and second outlets, the filter element occluding the fluid flow path between the inlet and at least one of the first and second outlets.

4. The water/hydrocarbon fluid separation system of claim 1, wherein at least one of the first and second outlets of the filter housing is in fluid communication with the collection basin.

5. The water/hydrocarbon fluid separation system of claim 1, the porous polymer layer having a thickness of about 0.2 mils to about 5 mils.

6. The water/hydrocarbon fluid separation system of claim 1, the porous polymer layer having a permeability of about 1 cfm/ft² to about 25 cfm/ft².

7. The water/hydrocarbon fluid separation system of claim 1, the porous substrate having a permeability of about 2 cfm/ft² to about 200 cfm/ft².

8. The water/hydrocarbon fluid separation system of claim 1, the porous substrate having a permeability greater than the permeability of the porous polymer layer.

9. The water/hydrocarbon fluid separation system of claim 1, the hydrophobic surface of the porous substrate having an initial water contact angle of greater than about 50°.

10. The water/hydrocarbon fluid separation system of claim 1, wherein the woven fiberglass is acid resistant.

11. The water/hydrocarbon fluid separation system of claim 1, the separation article comprising a laminate.

12. The water/hydrocarbon fluid separation system of claim 1, the porous substrate thermally welded to the porous polymer layer.

13. The water/hydrocarbon fluid separation system of claim 1, the separation article comprising an adhesive adhering the porous substrate to the porous polymer layer.

14. The water/hydrocarbon fluid separation system of claim 1, the system configured to remove at least about 95% of emulsified water from a hydrocarbon fluid with an interfacial tension of between 7 dynes/cm and 40 dynes/cm.

15. The filter element of claim 1, wherein the porous polymer layer further comprises silicone.

16. A filter element for separating emulsified water from a hydrocarbon fluid, the filter element comprising:
a separation article comprising:
a porous polymer layer comprising polytetrafluoroethylene and silicone, the porous polymer layer having an average pore size of between about 0.5 µm to about 5 µm; and
a porous substrate layer comprising a hydrophobic surface, the porous polymer layer disposed adjacent to the porous substrate layer, the porous substrate having a thickness of about 1 mils to about 60 mils, the porous substrate layer configured to selectively reject water and permeate liquid hydrocarbons;
wherein the porous polymer layer and porous substrate layer surround a central filter lumen, and the central filter lumen is in fluid communication with a top opening in the separation article;
wherein the separation article is configured such that water is collected upstream of the separation article; and
hydrocarbons flow through the separation article and out a top opening of the separation article.

17. The filter element of claim 16, the porous polymer layer having a thickness of about 0.2 mils to about 5 mils.

18. The filter element of claim 16, the porous polymer layer having a permeability of about 1.0 cfm/ft$^2$ to about 25 cfm/ft$^2$.

19. The filter element of claim 16, the porous substrate having a permeability of about 2 cfm/ft$^2$ to about 200 cfm/ft$^2$.

20. The filter element of claim 16, the porous substrate having a permeability greater than the permeability of the porous polymer layer.

21. The filter element of claim 16, the hydrophobic surface of the porous substrate having a water contact angle of greater than about 50°.

22. The filter element of claim 16, the porous substrate comprising woven fiberglass.

23. The filter element of claim 16, the porous substrate comprising acid resistant woven fiberglass.

24. The filter element of claim 16, the porous substrate comprising cellulose impregnated with silicone.

25. The filter element of claim 16, further comprising a cylindrical inner liner, the separation article disposed on the cylindrical inner liner.

\* \* \* \* \*